Nov. 5, 1957 — J. A. LAUCK — 2,811,956

THERMOSTATIC FAN DRIVE

Filed Jan. 7, 1955

Inventor:
John A. Lauck
By: Joseph R. Dwyer
Atty.

United States Patent Office 2,811,956
Patented Nov. 5, 1957

2,811,956

THERMOSTATIC FAN DRIVE

John A. Lauck, Shaker Heights, Ohio, assignor to Borg-Warner Corporation, Chicago, Ill., a corporation of Illinois Application January 7, 1955, Serial No. 480,388

5 Claims. (Cl. 123—41.12)

This invention relates to automotive vehicle fan drives and more particularly to fan drives operable intermittently and automatically in accordance with the need for cooling or warming the engine.

It is well known that the engine crankshaft of an automotive vehicle is frequently connected to and rotates the engine fan, usually by means of a V-belt drive so that upon operation of the engine there is concurrent operation of the cooling fan.

During the winter season it is advantageous to encourage the engine of the automotive vehicle to warm up as soon as possible, after starting, so as to have smooth engine performance. Almost all automobile manufacturers have partially solved this problem by inserting a temperature responsive valve in the engine cooling system operable to preclude circulation of the coolant until the engine, and thus the coolant, has reached a predetermined temperature. A more complete solution to the above problem involves disconnecting the fan during the initial warm-up period. Obviously, operation of the fan at this time would tend to prolong the interval during which the engine would otherwise warm-up automatically. Furthermore, disconnection of the fan during warm-up is advantageous to reduce the load upon the engine.

Accordingly, it is an object of the present invention to provide in an automotive vehicle a temperature responsive mechanism operable to disengage the engine fan from its driving mechanism.

A further object of the present invention is to provide in a liquid cooled engine a clutching device responsive to fluid pressure and controlled by changes in coolant temperature for operatively connecting the engine of an automotive vehicle to the fan thereof.

A further object of the present invention is to provide a first circuit containing a fluid or gas whose volume changes readily with changes in temperature for operating a hydraulic valve contained within a second fluid circuit where the second fluid circuit includes mechanism for engaging and disengaging a cooling fan to and from its driving means.

An apparatus embodying certain features of the present invention may include an automotive engine having a liquid cooling system and a liquid lubrication system, a fan for cooling the coolant within the cooling system, a clutch means responsive to hydraulic pressure for operatively connecting the fan to the engine and temperature responsive means associated with said engine cooling system and adapted to direct fluid pressure developed in said engine lubrication system to said clutch means whereby the clutch is operated to make a driving connection between the fan and the engine whenever the fluid within the engine cooling system becomes unduly warm.

Certain other features and advantages of the present invention will become apparent when read in conjunction with the specification and the appended drawings in which.

Figure 1:
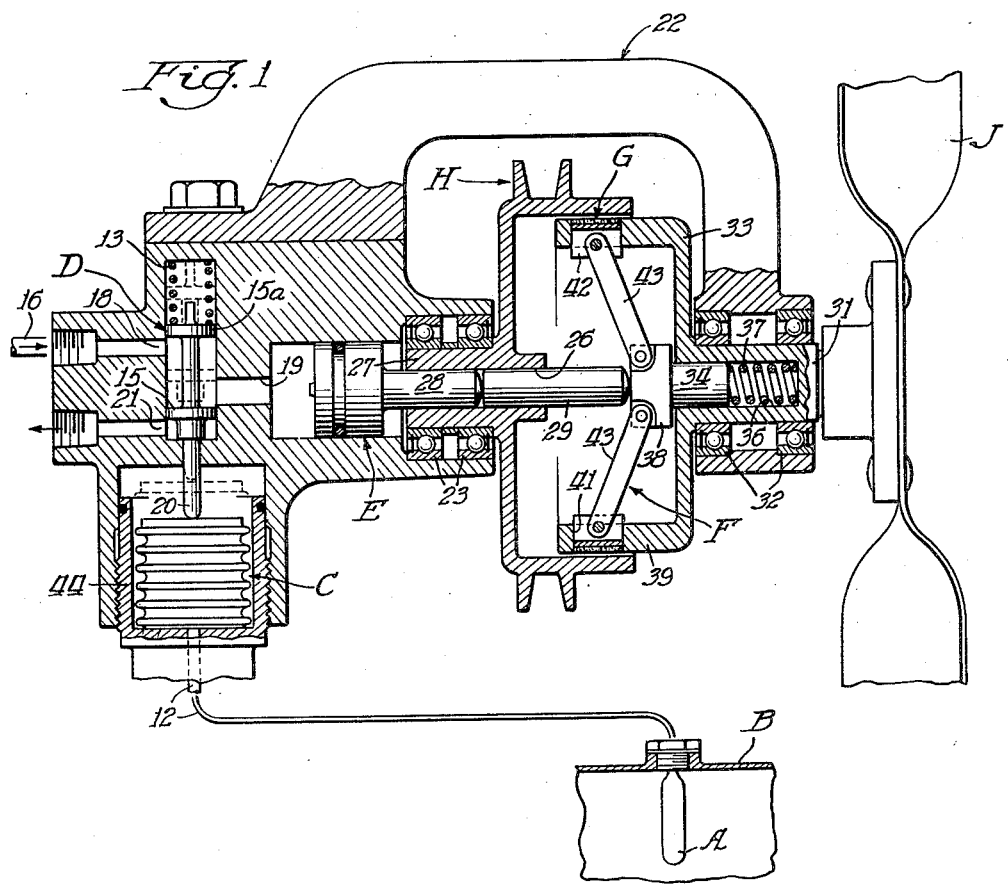
Fig. 1 shows an application of the present invention to an automotive vehicle.

In Fig. 1 there is shown an exemplary embodiment of the present invention comprising in general a pressure vessel A, disposed within a conventional automobile radiator B, a bellows C for operating a spool valve D to admit fluid under pressure to the head of a piston E and a toggle assembly F for operating a clutch G whereby a driven sheave H is operatively connected to a fan J.

Referring further to Fig. 1, the pressure vessel A, filled with fluid or gas of the type whose volume changes readily with changes in temperature, communicates with the expandable bellows C by means of a conduit 12. The pressure vessel A, the bellows C and the conduit 12 comprises a closed fluid system wherein changes in temperature of the radiator coolant surrounding the pressure vessel A will cause expansion and contraction of the fluid within the closed system thus encouraging the bellows C to expand and contract accordingly. Located adjacent the bellows C and urged downwardly by a spring 13 is the spool valve D. The valve D is composed of two spools 15 and 15a and a stem 20. When the engine coolant is cold, the bellows C will be contracted and the spools will assume the position shown in solid lines in response to the spring 13 thus placing an inlet port 18 in communication with a piston port 19. When the engine coolant is unduly warm, the bellows C will expand and the spools will assume the dotted line position to close inlet port 18 and to vent the piston port 19 to the output port 21 and thence to a sump. When the port 18 communicates with the port 19, fluid pressure is supplied to the head of the piston E through a conduit 16. The source of the fluid directed to the head of the piston E may be the engine crankcase or the central hydraulic system of an automotive vehicle.

The bellows C, the valve D, and the piston E are housed within a generally C-shaped frame indicated generally by the reference numeral 22. The frame 22 is suitably mounted to the engine block of the vehicle so that the fan J, also supported by the frame 22, may be disposed behind the automobile radiator B in conventional fashion. The sheave H is rotatably supported in the frame 22 by the bearings 23 and is operatively connected to the engine crankshaft by means of a conventional V-belt (not shown). A bore 26 formed in the hub 27 of the sheave H accommodates piston rod 28 and a pin 29 both slidable within the bore 26. The fan J, rigidly connected to a spindle 31, is supported in the frame 22 by means of bearings 32. Formed integral with the spindle 31 is a flanged member 33 which assumes a telescoped relationship with respect to the inner side of the sheave H. The toggle assembly F, having a stub shaft 34, is supported within a bore 36 formed in the spindle 31. A spring 37 urges the stub shaft 34 and a hub 38 into engagement with the pin 29 and the piston rod 28.

Portions of the skirt 39 of the flanged member 33 are formed with notches as at 41 for accommodating clutch shoes 42. The shoes 42 are movably supported by the arms 43 so that toggle action is developed whenever the hub 38 is moved to the left or to the right as viewed in Fig. 1. It is apparent that when the head of the piston E is vented, the spring 37 will urge the hub 38 to the left, as viewed in Fig. 1, thus bringing about the engagement of the shoes 42 with the underside of the sheave H. Since the shoes 42, when engaged, are nested in the apertures 41, a driving connection will be established from the crankshaft (not shown) to the fan J, through the sheave H and the flanged member 33. Correspondingly, movement of the hub 27 to the right, as viewed in Fig. 1, and in response to the fluid pressure applied to the head of the piston E, will disengage the shoes 42 from the sheave H, thus breaking the driving connection to the fan J. By virtue of adjusting nut 44, relative position of the valve D with respect to frame 22 may be regulated as desired.

It is to be understood that the expansion and contraction of the bellows C in cooperation with the spring 13 control the movement of the valve D. Thus, when the engine coolant is cold, the valve D will assume the solid line position shown in Fig. 1, thus opening the port 18 to admit fluid pressure to the head of the piston E to hold the clutch shoes 42 disengaged. Correspondingly, when the engine coolant is warm, the valve D will assume the dotted line position to close the port 18 and to open the port 21 to vent the head of the piston E, thus permitting the spring 37 to cause the shoes 42 to engage the sheave H, thus driving the fan. In order to provide for limited movement of the valve without disturbing the engaged or disengaged condition of the clutch G, the spool 15 formed on the stem 20 of the valve D may be designed of various widths and may be located at various distances from the spool 15a. This flexibility of design facilitates the selection of a relatively high coolant temperature for setting the fan into operation and the selection of a relatively low coolant temperature for rendering the fan inoperative.

The action described above will continue cyclically to engage and disengage the fan dependent upon whether the temperature of the engine coolant rises above or falls below predetermined high and low temperatures.

Figure 2:
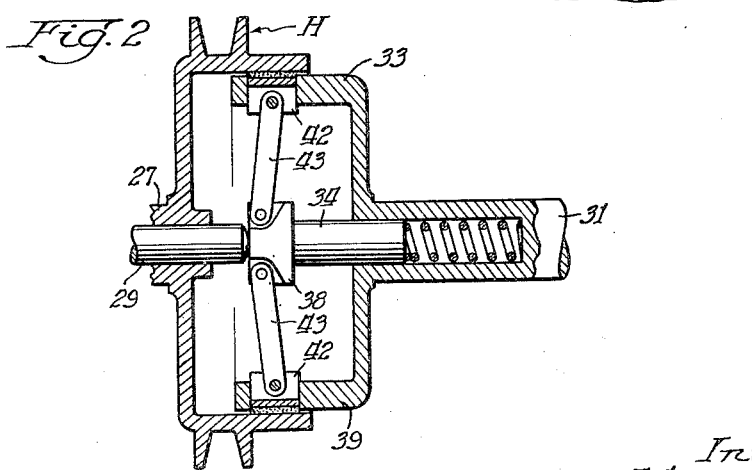
Fig. 2 is a view similar to Fig. 1 and showing another embodiment of the present invention.

The embodiment of the invention shown in Fig. 2 is similar to that shown in Fig. 1 and similar reference numerals are used to designate similar parts. The chief difference in the embodiment of Fig. 2 is that the action of the toggle assembly thereof is reversed. For example, movement of the piston E to the right in response to fluid pressure operates to move the hub 33 against the action of the spring 37 thereby engaging the shoes 42 with the sheave H. When the fan has been operated for an interval sufficient to reduce the temperature of the engine coolant to a safe operating temperature, the bellows C contracts to vent the head of the piston E so that the spring 37 urges the hub 38 to the left thus disengaging the shoes 42 from the sheave H.

It is to be noted that in all embodiments of the present invention suitable bleed passageways must be provided in the spool valve D and the hydraulic piston E in order to preclude a fluid block.

The preferred embodiment of the present invention is that shown in Fig. 1. A particular feature of this embodiment is the cooperation of the spring 37 with the centrifugal force exerted upon the shoes 42, while rotating, to hold the shoes in engagement with the sheave H. It is apparent that when the fan is being driven that the shoes 42 are being held in engagement with the sheave H by a force additional to that supplied by the spring 37, namely, the centrifugal force developed in the shoes 42. The effect of the centrifugal force developed in the shoes 42 is to increase the clutching friction between the shoes and the sheave H as the fan speed increases. Thus, the Fig. 1 embodiment of the invention insures a subsantially slip-free connection when the clutch is engaged.

It is anticipated that various arrangements and adaptations of the present invention may be devised without departing from the spirit and scope thereof.

I claim:

1. In an automotive vehicle having a liquid cooled engine, a fan, power means adaptable to drive the fan, the combination therewith of a thermostatically controlled fluid pressure means responsive to engine temperature, a toggle clutch mechanism operatively associated with said fluid pressure means, said toggle clutch mechanism comprising a flanged member attached to said fan, a toggle hub, friction shoes radially slidable in recesses in said flanged member and adapted to engage a driving member of said power means to establish a driving connection therewith, said engagement being controlled by opposing action of a spring means and said fluid pressure means.

2. In an automotive vehicle having a liquid-cooled engine, a fan, power means adaptable to drive the fan, the combination therewith of a thermostatically controlled valve arrangement, a toggle clutch mechanism operatively associated with said valve arrangement, said toggle clutch mechanism comprising a flanged member attached to said fan, a toggle hub, friction shoes pivotally connected to said hub, said friction shoes being radially slidable in recesses in said flanged member for intermittent operative connection with said power means, said operative connection being controlled by opposing action of a spring means and said thermostatically controlled valve arrangement.

3. In an automotive vehicle having a liquid-cooled engine, a fluid pressure system, a fan, power means adaptable to drive the fan, a toggle clutch mechanism controlled by the temperature of said liquid-cooled engine and operable in response to changes in the temperature of the engine, said toggle clutch mechanism comprising a flanged member attached to said fan, a toggle hub, friction shoes pivotally connected to said toggle hub, said friction shoes being radially slidable in recesses in said flanged member and adapted to engage a driving member of said power means to establish a driving connection therewith, said engagement being controlled by opposing action of a spring means and fluid pressure from said fluid pressure system.

4. An automotive vehicle comprising a liquid-cooled engine, a liquid lubrication system, a fan, and power means adaptable to drive the fan; the combination therewith of a toggle clutch mechanism, responsive to fluid pressure developed in said lubrication system and controlled by the temperature of said engine for establishing a driving connection between the power means and the fan, said toggle clutch mechanism comprising a flanged member attached to said fan, a toggle hub, friction shoes pivotally connected to said toggle hub, said friction shoes being radially slidable in recesses in said flanged member for intermittent operative connection with said power means, said operative connection being controlled by opposing action of a spring means and fluid pressure developed in said lubrication system.

5. An automotive vehicle comprising a liquid-cooled engine, a central hydraulic system, a fan, and power means adaptable to drive the fan, the combination therewith of a toggle clutch mechanism responsive to fluid pressure developed in said hydraulic system and controlled by the temperature of said engine for establishing a driving connection between the power means and the fan, said toggle clutch mechanism comprising a flanged member attached to said fan, a toggle hub, friction shoes pivotally connected to said toggle hub, said friction shoes being radially slidable in recesses in said flanged member for intermittent operative connection with said power means, said operative connection being controlled by opposing action of a spring means and fluid pressure developed in said hydraulic system.

References Cited in the file of this patent

UNITED STATES PATENTS

| | | |
|---|---|---|
| 1,913,268 | De Loach | June 6, 1933 |
| 2,438,161 | Greenlee | Mar. 23, 1948 |
| 2,611,347 | Nallinger | Sept. 23, 1952 |
| 2,661,148 | Englander | Dec. 1, 1953 |